June 16, 1964     M. TURKAT     3,137,132
INTERNALLY COOLED ROCKET NOZZLE
Filed Nov. 15, 1961
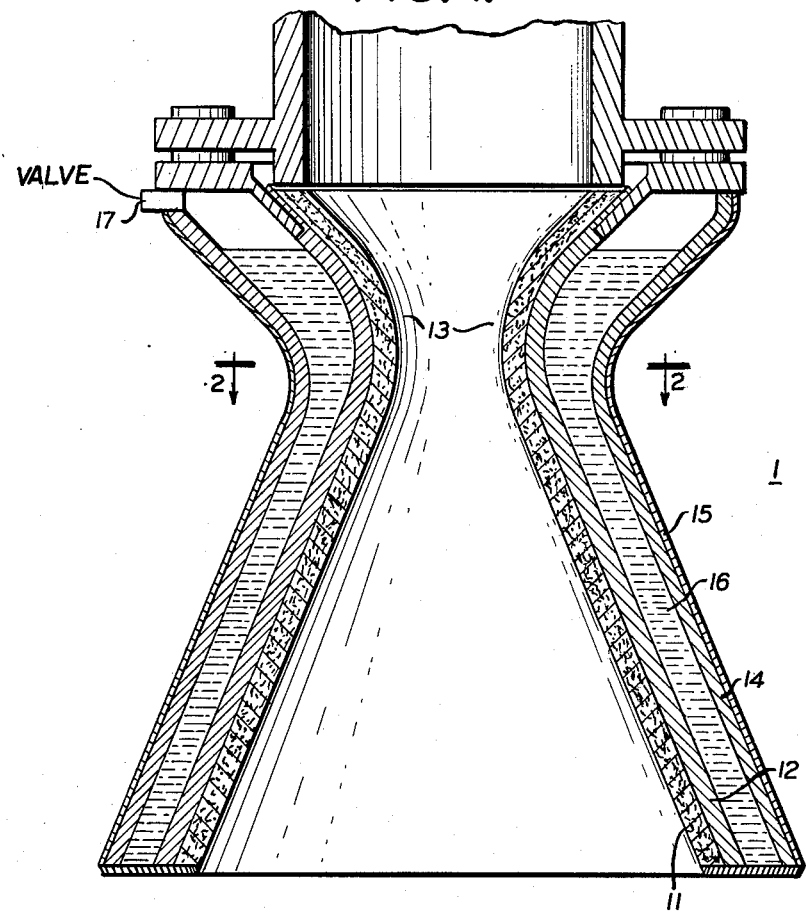
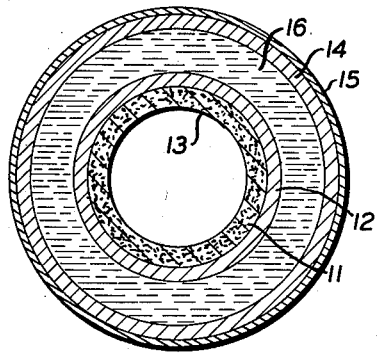
INVENTOR
MICHAEL TURKAT
ATTORNEY.

3,137,132
INTERNALLY COOLED ROCKET NOZZLE
Michael Turkat, Bayside, N.Y., assignor to Space Age Materials Corp., Woodside, N.Y.
Filed Nov. 15, 1961, Ser. No. 152,540
1 Claim. (Cl. 60—35.6)

This invention relates to the rapid and efficient cooling of rocket nozzles.

In cooling high temperature rocket nozzles and the like where high heat energy and high speed flow of gases develop from liquid or solid propellants, many problems arise as a consequence of the thermal and mechanical stresses developed in the wall of the nozzle by the high energy gas stream.

Cooling and efficient heat absorption become an especially acute problem in rocket nozzles using solid propellants whose flame temperatures exceed 6500° Fahrenheit. At the throat area of the nozzle there arises a particular and major problem where it becomes necessary to transfer exceedingly high amounts of heat away from a very small area.

Current solid propellants utilizing metal additives achieve flame temperatures of 5600° Fahrenheit. Protective coatings for rocket nozzles in this temperature range have been provided in the prior art to cope with the heat distribution problems existing at these temperatures.

However, in the case of solid propellants and particularly those having flame temperatures exceeding 6500° Fahrenheit and approaching 8000° Fahrenheit, the melting points of all elemental and compound solids is exceeded. While ablative solids can be used, this would be only at the expense of variable changes in the nozzle throat area.

Accordingly, it is an object of the present invention to provide a self-cooled rocket nozzle which will permit the use of high temperature propellants therewith in the temperature range of 6500° to 8000° Fahrenheit without excess heat loss and yet maintain a substantially constant nozzle throat area.

Another object of the invention is the self-cooling of a rocket nozzle by vaporization of encased lithium or sodium whose vapor is released in accordance with a predetermined vapor pressure produced by the heat transferred to the liquid metal.

A feature of the invention is a rocket nozzle having a protective coating of pyrolytic graphite.

Another feature of the invention is a rocket nozzle utilizing high temperature propellants wherein a thin hollow wall niobium shell and a pyrolytic graphite protective layer deposited thereon provides a predetermined heat insulation.

Another feature of the invention is a rocket nozzle for solid propellants having high flame temperatures wherein automatic self-cooling is provided by a vaporizable metal whose vapor can be released at a predetermined pressure.

Another feature of the invention is a self-contained medium for rocket nozzles which can be vaporized by the propellant's burning and released at atmospheric pressure.

Other objects and features of the present invention will become apparent in view of the following descriptions considered in connection with the accompanying drawings in which:

FIGURE 1 is an elevational section of a rocket nozzle construction in accordance with the invention.

FIGURE 2 is a horizontal section of the rocket nozzle shown in FIGURE 1 taken along line 2—2.

Referring now to FIGURE 1 of the drawing, a rocket nozzle 1 is fabricated from pyrolytic graphite and niobium, which are capable of sustaining the high operating temperatures as well as combating the corrosive action of propellants whose flame temperatures exceed 6500° Fahrenheit.

The pyrolytic graphite liner 11 acts as an internal protective covering for the main nozzle 1 by heat insulating the thin hollow wall niobium metal shell 12 in the interior of the nozzle body. The rocket nozzle 1 is provided with a constricted throat section 13 whose area it is desired to maintain constant during its operation with high temperature propellants.

The pyrolytic graphite liner 11 provides heat insulation for the main nozzle body and more importantly, permits higher surface temperatures than is the case with conventional metals. By the use of the pyrolytic graphite liner 11, heat losses to the main nozzle 1 are effectively reduced and a higher efficiency in the operation of the nozzle results.

Referring to the rocket nozzle construction in greater detail, the nozzle body 1 comprises a pyrolytic graphite liner 11 in the interior and a niobium liner 12 deposited thereon, preferably by vapor decomposition. The rocket nozzle 1 is provided with an outer niobium shell 14 fabricated on a special mandrel and brazed to the interior liner 12. On the outer surface of the niobium shell 14, there is provided a protective coating 15 of alumina-silica or other suitable coating for the purpose of protecting the shell from oxidation processes accelerated by the high temperatures created by the burning solid propellants.

Between the inner niobium shell 12 and the outer niobium shell 14 there is located a vacuum box 16 outgassed and filled with liquid lithium metal to a proper level. The amount of lithium metal needed in any particular installation will depend on the factor of firing time and propellant temperature. The liquid lithium is permitted to freeze and solidify in the space 16. A spring valve 17 serves to seal off the lithium metal in the space 16.

The self-cooled rocket assembly 1 can withstand temperatures of 6000°–8000° Fahrenheit or more produced during the burning of the solid propellant. The rocket nozzle 1 will retain its original shape, size and configuration with negligible distortion at these high temperatures for a period of time which should be sufficient for the duration of its required powered flight. It will also offer superior controlled flame and exhaust pressure to the rocket, whereas conventional materials would melt or ablate away and result in erratic flight of a missile or space ship.

Approximately 130 seconds burning time is required to heat up pyrolytic graphite liner 11 and vaporize the lithium contained in space 16 with no generated heat being dumped. However, during the operation of the rocket, the vapor pressure of the lithium will rise and when it reaches one atmosphere, for example, a release valve 17 opens slowly releasing lithium vapor to the atmosphere or other ambient surroundings.

It should be apparent that the lithium vapor can also be directed in various modifications of the invention to give additional cooling of the rocket. Also the amount of vapor released may be controlled as desired by a micronic sized porous filter.

Other metals other than lithium may be used for cooling and for lower heat load applications; sodium and the corresponding alkali metals of the Mendeleef Periodic Table will be found suitable. Likewise, other metals, or the like which can boil off and evaporate to provide a self-cooling effect to maintain the basic nozzle materials intact at high temperatures and which have a high heat of vaporization are within the purview of the invention.

Carbides and carbon-refractory metal alloys can be used in the practice of the invention in lieu of niobium or pyrolytic graphite.

GENERAL PRINCIPLES OF OPERATION—SIMPLIFIED EXAMPLE

Lithium

Specific heat of lithium—1.0 B.t.u./lb. ° F.
Heat of vaporization—8600 B.t.u./lb.
Heat capacity room temperature to boiling at 2400° F. (1 atmos.) 2400+8600=11,000 B.t.u./lb.

Graphite

Specific heat—0.5 B.t.u./lb. ° F.
Heat capacity room temperature to 4000° F. (av. temp.)—2000 B.t.u./lb.

Nozzle

Assume 3.75" nozzle—length 12"—expansion ratio 3:1—weight empty 40 lbs., of which 10 lbs. is graphite liner—weight of lithium added 20 lbs. (5 gals.)

Heat Balance

Total heat capacity of lithium—all vaporized no heat:

|  | B.t.u. |
|---|---|
| Dumped | 220,000 |
| Graphite | 20,000 |
| Total | 240,000 |

*Heat Transfer to Nozzle—Average Values (Measured)*

|  | B.t.u./sec. |
|---|---|
| Throat section—8 B.t.u./in.²—sec.×24 in.² | 192 |
| Entrance section—4 B.t.u./in.²—sec.×80 in.² | 320 |
| Exit section—4 B.t.u./in.²—sec.×330 in.² | 1320 |
| Total | 1832 |

It should be understood by those skilled in the art to which this invention pertains that the cooling principles and structures in accordance with the invention are applicable to other analogous fields, such as rocket chambers, gas generators, jet chambers and the like. Also, the rocket nozzle may be made completely from refractory metals, such as tungsten and containing a hollow core or chamber, for cooling the nozzle.

Although a typical embodiment of the invention has been illustrated and described herein, it should be apparent to those skilled in the art that various changes and modifications may be made in the construction and arrangement shown without departing from the spirit and scope of the invention.

What I claim is:

A self-cooled rocket nozzle subjected to propellants having flame temperatures in the range of 6000 degrees to 8000 degrees Fahrenheit, comprising a main body section having spaced inner and outer shells of refractory material defining a closed chamber therebetween, and a reservoir of a low melting point metal within said closed chamber, said inner and outer shells being formed of niobium, the inner shell having an exterior liner of pyrolytic graphite formed thereon to protect said inner shell against the elevated flame temperatures of the propellants, said outer niobium shell having an external coating of alumina-silica to protect it against oxidation, said low melting point metal being selected from the group consisting of sodium and lithium, and a spring-biased valve connected to said closed chamber and being adapted to open under a predetermined metal vapor pressure developed by said low melting point metal under the heat generated by the burning propellant, thereby maintaining the nozzle at a predetermined temperature level below the melting point of niobium.

References Cited in the file of this patent

UNITED STATES PATENTS

| 2,354,151 | Skoglund | July 18, 1944 |
|---|---|---|
| 2,574,190 | New | Nov. 6, 1951 |
| 2,994,124 | Denny et al. | Aug. 1, 1951 |
| 3,014,353 | Scully et al. | Dec. 26, 1961 |
| 3,022,190 | Feldman | Feb. 20, 1962 |
| 3,026,806 | Runton et al. | Mar. 27, 1962 |
| 3,048,972 | Barlow | Aug. 14, 1962 |

FOREIGN PATENTS

| 792,909 | Great Britain | Apr. 2, 1958 |

OTHER REFERENCES

Aviation Week publication, Feb. 13, 1961, pages 67, 69, 71 and 72 relied on.

Aviation Week publication, Dec. 7, 1959, pages 99 and 101 relied on.

Rocket Refractories, Naval Ordnance Report N. 4893, No. N.O.T.S. 1191, Aug. 26, 1955, pages 9 and 10 relied on.